United States Patent
Kopetz (10) Patent No.: US 10,324,797 B2
(45) Date of Patent: Jun. 18, 2019

(54) FAULT-TOLERANT SYSTEM ARCHITECTURE FOR THE CONTROL OF A PHYSICAL SYSTEM, IN PARTICULAR A MACHINE OR A MOTOR VEHICLE

(71) Applicant: FTS COMPUTERTECHNIK GMBH, Vienna (AT)

(72) Inventor: Hermann Kopetz, Baden (AT)

(73) Assignee: TTTech Auto AG, Vienna (AT)

(*) Notice: Subject to any disclaimer, the term of this patent is extended or adjusted under 35 U.S.C. 154(b) by 157 days.

(21) Appl. No.: 15/440,449

(22) Filed: Feb. 23, 2017

(65) Prior Publication Data
US 2017/0249214 A1    Aug. 31, 2017

(30) Foreign Application Priority Data
Feb. 26, 2016  (AT) ............... A 50142/2016

(51) Int. Cl.
*G06F 11/00* (2006.01)
*G06F 11/14* (2006.01)
(Continued)

(52) U.S. Cl.
CPC ............ *G06F 11/142* (2013.01); *G05B 19/04* (2013.01); *G06F 11/1438* (2013.01);
(Continued)

(58) Field of Classification Search
CPC ....... G05B 19/04; H04L 67/12; H04L 41/046; H04L 2012/40215; H04L 2012/40273;
(Continued)

(56) References Cited

U.S. PATENT DOCUMENTS

2004/0117685 A1* 6/2004 Truchard ............... H04L 67/12
                                                                 713/502
2004/0128673 A1* 7/2004 Fuchs .................... G06F 9/542
                                                                 719/310
(Continued)

FOREIGN PATENT DOCUMENTS

WO  2013/138833 A1  9/2013
WO  2014/205467 A1  12/2014

OTHER PUBLICATIONS

Lars-Berno Fredrikson, "TTCAN explained", second edition, 2002 (Year: 2002).*

(Continued)

*Primary Examiner* — Michael Maskulinski
(74) *Attorney, Agent, or Firm* — Eversheds Sutherland (US) LLP (57) ABSTRACT

A fault-tolerant distributed real-time computer system for controlling a physical system, in particular a machine or a motor vehicle, wherein the components of the computer system have access to a global time of known precision, and wherein the node computers and intelligent sensors and the intelligent actuators exchange time-triggered messages and event-triggered messages periodically via the distributor units, and wherein the functions of the user software are contained in real-time software components—RTSC—and the periodic time-triggered data transfer between the RTSC is specified by a time-triggered data flow diagram, and wherein the assignment of the RTSC to a TTVM of a node computer and specific parameters of the TTVM are contained in active local allocation plans for each RTSC, and wherein the time plans for the time-triggered communication in this distributor unit are contained in active local allocation plans for each distributor unit, and wherein a global allocation plan consists of the totality of the local allocation plans, which are adapted to one another, of all (Continued)

RTSC and all distributor units of the user software, and wherein a monitor component periodically receives a copy of messages of the node computers to define the present operating state of the node computers, and wherein after the permanent failure of one or more RTSC, the monitor component activates a passive global allocation plan which specifies the allocation of the RTSC and the data supply thereof on newly installed TTVMs to the still functional node computers, and wherein the RTSC arrive at the newly configured TTVMs for execution at the provided periodic restart point in time in accordance with the selected passive global allocation plan.

20 Claims, 2 Drawing Sheets (51) Int. Cl.
*H04L 12/24* (2006.01)
*H04L 29/08* (2006.01)
*G05B 19/04* (2006.01)
*G06F 11/20* (2006.01)
G06F 11/16 (2006.01)
G06F 11/18 (2006.01)

(52) U.S. Cl.
CPC ...... *G06F 11/1484* (2013.01); *G06F 11/2025* (2013.01); *G06F 11/2035* (2013.01); *H04L 41/046* (2013.01); *H04L 67/12* (2013.01); *G06F 11/1641* (2013.01); *G06F 11/184* (2013.01); *G06F 2201/805* (2013.01); *G06F 2201/82* (2013.01)

(58) Field of Classification Search
CPC .............. G06F 11/142; G06F 11/1438; G06F 11/1484; G06F 11/2025; G06F 11/2035; G06F 13/3625; G06F 1/00–14; G06F 9/45533; G06F 9/5077
See application file for complete search history.

(56) References Cited

U.S. PATENT DOCUMENTS

| | | | |
|---|---|---|---|
| 2013/0166778 A1* | 6/2013 | Ishigooka | H04L 12/4035 709/248 |
| 2013/0332926 A1 | 12/2013 | Mirko et al. | |
| 2015/0039929 A1* | 2/2015 | Poledna | G06F 11/004 714/2 |
| 2016/0147568 A1* | 5/2016 | Poledna | G06F 9/4887 718/102 |
| 2017/0161116 A1* | 6/2017 | Kopetz | G06F 9/45558 |

OTHER PUBLICATIONS

European Search Report, EP App. 17157802.4-1554, dated Jul. 25, 2017 (15 pages).

Pinho, Luis Miguel, et al., "An Architecture for Reliable Distributed Computer-Controlled Systems", Architecture and Design of Distributed Embedded Systems, Kluwer Academic Publishers, Jan. 1, 2001).

Obermaisser, R., et al., "Architectures for Mixed-Criticality Systems based on Networked Multi-Core Chips", Proceedings of the 2014 IEEE Emerging Technology and Factory Automation (ETFA), IEEE, Sep. 16, 2014.

Campbell, B., et al., "Security Assertion Markup Language (SAML) 2.0 Profile for OAuth 2.0 Client Authentication and Authorization Grants", Internet Engineering Task Force, Request for Comments: 7522, Category: Standards Track, ISSN: 2070-1721, May 2015.

Kopetz, H., "Real-Time Systems—Design Principles for Distributed Embedded Applications", pp. 24-25; 86-88; 91-94; 153-158, 2011.

* cited by examiner

FAULT-TOLERANT SYSTEM ARCHITECTURE FOR THE CONTROL OF A PHYSICAL SYSTEM, IN PARTICULAR A MACHINE OR A MOTOR VEHICLE

The invention relates to a fault-tolerant distributed real-time computer system for the control of a physical system, in particular a machine or a motor vehicle, which comprises the following components:
 node computers,
 distributor units,
 intelligent sensors, and
 intelligent actuators,
wherein these components have access to a global time of known precision, and wherein the node computers and intelligent sensors and the intelligent actuators periodically exchange time- triggered messages and event-triggered messages via the distributor units.

The invention is in the field of computer technology. It relates to a fault-tolerant system architecture for the control of a physical system, in particular a safety-critical machine, in particular a motor vehicle.

A fault-tolerant distributed hardware architecture comprises the following components: a plurality of node computers, distributor units, and intelligent sensors/actuators, wherein the components have access to a global time of known precision and wherein the node computers and intelligent sensors/actuators periodically exchange time-triggered messages via the distributor units.

A node computer is a computer having one or more communication channels, on which a real-time operating system provides the runtime environment for executing user software.

A distributor unit is a device having communication channels, which relays a received message to one or more receivers.

The functional combination of a physical sensor with a node computer is referred to as an intelligent sensor. Intelligent sensors are frequently offered on the market as compact structural units having an interface to a standardized real-time communication system.

An intelligent sensor is a device which firstly converts physical variables to be detected into a bit pattern. This bit pattern is checked for plausibility in the scope of the preprocessing by the intelligent sensor and converted into a routine physical measured variable. Subsequently, this measured variable is transmitted in a message to the receiver of interest.

The functional combination of a physical actuator with a node computer is referred to as an intelligent actuator. Intelligent actuators are frequently offered on the market as compact structural units, preferably having an interface to a standardized real-time communication system.

An intelligent actuator is a device which converts a digital target value received in a message at the predetermined point in time into a physical variable and outputs it to the process and thus influences the physical process in a physical system or machine.

An intelligent sensor/actuator consists of a transducer, a preferably integrated node computer having user software, and a communication controller.

A communication system is time-triggered if the point in time of the beginning of the transmission of a message is determined by a node computer or a distributor unit from the progress of global time. The periodically reoccurring points in time at which a message has to be transmitted are to be specified a priori in a time-triggered communication system in the form of a time plan.

The user software system consists of a set of real-time software components (RTSC), which are not device-fixed, and the device-fixed software in the sensors/actuators, which exchange data by means of time-triggered messages in accordance with a pre-established data flow diagram.

A real-time software component (RTSC) is understood as a component of an extensive real-time-capable user software system, which, under the presumption of a suitable runtime environment, calculates the intended output data and a new inner state of the RTSC within a pre-established real time interval from the provided input data and an inner state of the RTSC.

The totality of the real-time software components (RTSC) of a distributed real-time computer system is referred to as user software.

The hardware architecture describes the hardware components and the physical data connections between the hardware components.

The user software of a distributed real-time computer system can be substantially separated from the hardware architecture by the concept of the time-triggered virtual machine (TTVM). The essential remaining relationship between an RTSC and the node computer on which the RTSC is executed is the definition of the length of a service interval (SI), which has to be provided by the operating system to be able to execute the RTSC on the given node computer in a timely manner. The introduction of TTVMs provides precisely defined interfaces between the user software and the hardware in the value range and in the time range.

It is an object of the invention to provide a solution for how a real-time computer system as described at the outset can be rapidly reconfigured in case of fault, and/or new requirements and functions can be integrated in running operation.

This object is achieved by a real-time computer system mentioned at the outset in that, according to the invention, functions, in particular all functions of user software are contained in real-time software components—RTSC—and the periodic time-triggered data transfer between the RTSC is specified by a time-triggered data flow diagram, and wherein, in active local allocation plans for each RTSC
 the assignment of the RTSC to a TTVM of a node computer
 and the following parameters of the TTVM
  beginning point in time and end point in time of the SI
  memory regions for calculations of the RTSC
  executable code of the RTSC
  the time plans for the time-triggered communication of these RTSC
 are specified, and wherein in active local allocation plans for each distributor unit, the time plans for the time-triggered communication in this distributor unit are contained, and wherein a global allocation plan consists of the totality of the local allocation plans, which are adapted to one another, of all RTSC and all distributor units of the user software,
 and wherein a monitor component periodically receives a copy of messages of the node computers to determine the present operating state of the node computers,
 and wherein after the permanent failure of one or more RTSC, the monitor component activates a passive global allocation plan, which specifies the allocation of the RTSC and the data supply thereof on newly installed TTVMs to the still functional node computers, and wherein the RTSC arrive on the newly configured TTVMs for execution at the provided periodic restart point in time in accordance with the selected passive global allocation plan.

Therefore, in the above-described situation, the presently active global allocation plan, which consists of the totality of the active local allocation plans, which are adapted to one another, of all RTSC and all distributor units of the user software, is replaced by a passive global allocation plan, so that this passive global allocation plan becomes the active global allocation plan.

Advantageous embodiments of the real-time computer system according to the invention are described hereafter, wherein these features can each be provided alone per se or in any arbitrary combination with one or more of the further features:

- the SI parameter of an SI interval in an allocation plan is dependent on the performance of the node computer on which a TTVM for an RTSC is installed, and where this SI parameter is specified a priori;
- a restart point in time of an RTSC is located in a periodically repeating ground-state interval;
- a periodic global restart point is a priori in a global ground state interval, during which ground state interval all RTSC and all distributor units remain in the ground state thereof;
- in each node computer and each distributor unit, an active local allocation plan is provided a priori, wherein preferably at least one passive local allocation plan can be or is stored in each node computer and each distributor unit;
- a new passive, local or global allocation plan is calculated during operation and the local allocation plan or plans is/are loaded into a node computer or a distributor unit;
- the monitor component receives a message with the ground state of an RTSC from the RTSC before the end of each ground state cycle;
- the monitor component transmits, after the failure of an RTSC, the last received ground state of this RTSC to the restarted RTSC;
- the monitor component selects, after a permanent failure of a node computer, a passive, preferably global allocation plan and allocates, after the allocation of safety-critical real-time software components to new TTVMs, the failed non-safety relevant real-time software components—NSRRTSC—according to the best-effort principle to TTVMs, which can be configured on the remaining functioning node computers;
- in the case in which a fault hypothesis specifies the fail-silent property of a node computer, active redundancy is implemented by the simultaneous activation of two independent TTVMs having the same RTSC, wherein the receiver continues the messages as soon one of the time-triggered messages has arrived from these two TTVMs;
- in the case in which the fault hypothesis does not specify the fail-silent property of a node computer, active redundancy is implemented by the simultaneous activation of three independent TTVMs having the same RTSC, wherein the receivers continue the messages as soon as two of the three received time-triggered messages contain bit-identical results;
- in the case in which the fault hypothesis does not specify the fail-silent property of a node computer, the fail-silent property is implemented by the simultaneous activation of two independent TTVMs having the same RTSC, wherein the receivers of the messages wait until both time-triggered messages should have arrived and discard the result if the results in the two time-triggered messages which have arrived are not bit-identical;
- the monitor component runs simultaneously on two TTVMs, which are executed on two different node computers, wherein the two results calculated independently of one another are transmitted by means of time-triggered messages via time-triggered communication channels to the specified receiver, and wherein a specified receiver waits until the a priori determined reception points in time of the two messages have been exceeded and, if both messages have arrived, compares the results contained in the messages and discards the received data if the two results are not bit-identical;
- the monitor component is executed on a self-checking node computer;
- intelligent sensors, which are connected to two distributor units, each transmit two copies of a time-triggered message simultaneously via two independent communication channels to the distributor units for further distribution, and wherein the final receiver of this message, as soon it has received a correct copy, discards the other copy;
- in a test operation, new expanded RTSC are installed in parallel to the existing RTSC on shadow TTVMs and supplied with the running input data of the process, wherein the output data of the new RTSC are not switched into the existing process;
- TTVMs for the existing RTSC are installed on a new hardware generation;
- at least one reserve node computer is provided to assume the functions of a failed node computer;
- the node computers and distributor units are allocated to two separate, in particular spatially separated structural units;
- a node computer, which implements a wireless connection to external computers, contains a security firewall.

The present invention discloses an innovative distributed system architecture and a method, which have the goal of controlling a physical system, especially a machine or a motor vehicle.

The present invention discloses how a monitor component can implement the expansion of the functions and the fault handling of a distributed real-time system by way of the reconfiguration of the real-time software components on new TTVMs.

The invention will be explained in greater detail on the basis of the following drawings with reference to an example. In the figures

The general relationships explained in the scope of the description of the figures apply in this case in the general scope of the present invention and are not restricted to the specific exemplary description of an embodiment of the invention as illustrated in the figures.

The user software system of a real-time computer system consists of a set of real-time software components (RTSC) and the software in the intelligent sensors/actuators, which exchange data with one another.

Figure 1:
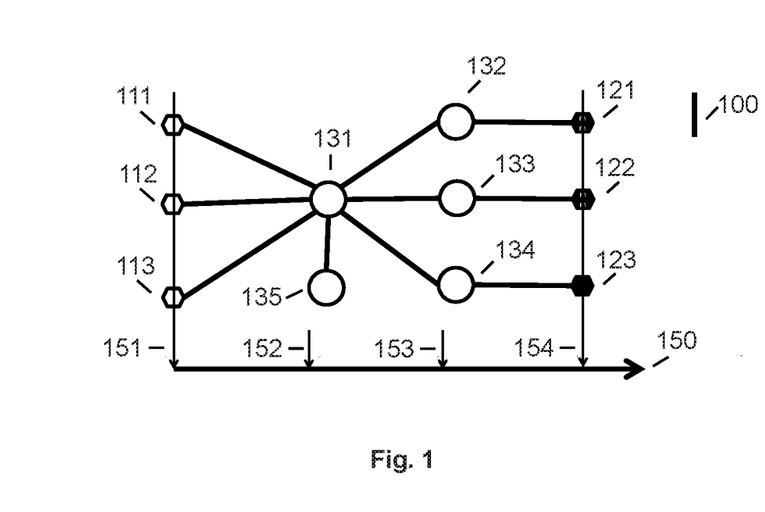
FIG. 1 shows a data flow diagram of an exemplary user software system.

FIG. 1 illustrates a small safety-relevant user software system. It comprises the following components: three intelligent sensors 111, 112, and 113, five RTSC, which are typically safety-relevant RTSC 131, 132, 133, 134, 135, referred to hereafter as SRRTSC, and three intelligent actuators 121, 122, 123. The data flow diagram in the upper part of FIG. 1 shows the components of the user software system and the data flow 100 between the components. In addition to the SRRTSC, further non-safety relevant RTSC (NSR-RTSC) can be provided, which are not considered in this illustration.

This user software system can be specified on the example of a driver assistance system. The intelligent sensor 111 is a camera, the intelligent sensor 112 is a radar system, and the intelligent sensor 113 is a laser system. These three intelligent sensors simultaneously observe the surroundings of a vehicle periodically. The captured data are preprocessed in the intelligent sensors, before they are transferred to the SRRTSC 131 for data fusion. The SRRTSC 131 fuses the received data and constructs a model of the surroundings of the vehicle. The SRRTSC 132 implements, using this model of the model constructed by the SRRTSC 131, a cruise control function and gives the result to the engine controller 121. The SRRTSC 133 implements, using this model from the SRRTSC 131, the lane control and gives the result to the steering system 122. The SRRTSC 134 implements, using this model of the SRRTSC 131, the emergency braking function and gives the result to the braking system 123. The SRRTSC 135 is a monitor component, which monitors the sequence of the calculations and causes a restart of a component in case of fault. Non-safety relevant components, such as the multimedia system in the vehicle, are not considered in this example.

Temporal Behavior

The data flow diagram in the upper part of FIG. 1 describes the functional behavior of the user software system, but not the temporal behavior.

While the progress of the physical processes in a system, the physical system process, depends on the progression of physical time, the execution duration of computer processes, as they run in computer nodes, for example, is determined by the clock frequency of the computer system.

In a distributed real-time computer system, the progression of the physical processes has to be synchronized periodically with the computer processes running in the node computers.

In a time-triggered distributed real-time computer system, this synchronization occurs at periodically repeating points in time defined a priori, at which the system processes are observed by the intelligent sensors 111, 112, and 113, to later influence them by means of the intelligent actuators 121, 122, and 123. The time interval between two observation points in time is referred to as a frame.

The dynamic response of the physical processes in the system determines the duration of a frame. The dynamic response of a physical process is understood as the maximum value of the derivative of a variable V, which describes the process curve, according to the time t. In the design phase of the user software system, the duration D of a frame is to be selected so that even in the extreme case of the highest dynamic response of the physical process, the change D.Max/dV/dt of a continuous process variable within one frame does not cause any substantial influence on the stated object.

If, in the specific example, the frame duration is defined at 10 ms, i.e., the environment is periodically observed every 10 ms, a vehicle thus covers approximately 28 cm in this sampling interval of 10 ms at a velocity of 100 km/h, at a velocity of 50 km/h, it is approximately 14 cm.

Real-time Transaction

We refer to the execution of an RTSC as a computing action, the execution of a message transmission from a transmitter to a receiver as a communication action, and the sequence of computing actions and communication actions between the observation of the surroundings by the sensors and the influencing of the surroundings by the actuators as a real-time transaction (RT transaction, see [Kop11, p. 24]).

In a time-triggered real-time computer system, the periodic beginning points in time of the actions are defined a priori within a frame sequence (both the computing actions and also the communication actions).

Because the surroundings are only observed at the beginning point in time of a frame, the computing actions are not interrupted within a frame.

The points in time which define the temporal sequence of this real-time application are plotted on the time axis 150 of FIG. 1. At point in time 151, the surroundings are observed simultaneously by the sensors 111, 112, and 113. At point in time 152, the computing action of the SRRTSC 131 begins, at point in time 153, the computing actions of the SRRTSC 132, 133, and 134 begin, and at point in time 154, the target values arrive at the intelligent actuators 121, 122, and 123.

The data flow diagram of FIG. 1, which is annotated with the points in time of the processing, represents a time-triggered data flow diagram.

In an extensive time-triggered real-time computer system, a set of frames of different period durations can be required. It is advantageous if each frame duration is a harmonic multiple of a shortest frame duration.

Hardware Architecture

Figure 2:
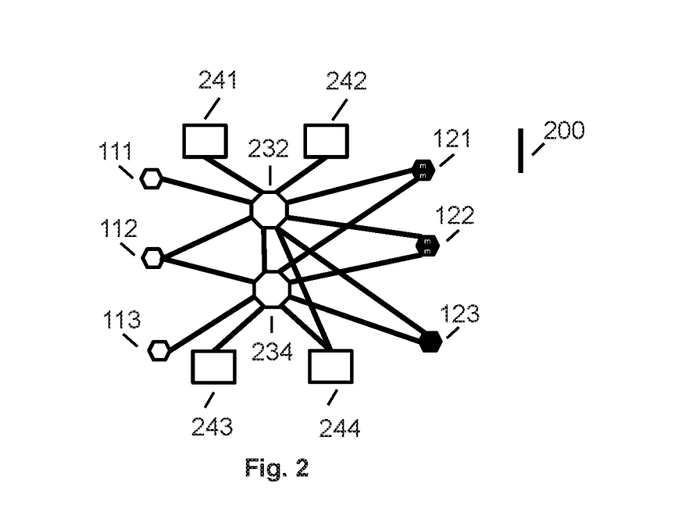
FIG. 2 shows the components of a hardware architecture consisting of sensors/actuators, distributor units, and node computers.

FIG. 2 shows a hardware architecture, i.e., a distributed real-time computer system, on which the user software system of FIG. 1 is executed. The intelligent sensors 111, 112, and 113 and the intelligent actuators 121, 122, and 123 are software/hardware units which, as shown in FIG. 1, are located at the beginning and at the end of each real-time transaction. The distributor units 232 and 234, the node computers 241, 242, 243, and 244, on which the SRRTSC 131, 132, 133, 134, and 135 are to be executed, and the communication channels 200 are located between these intelligent sensors 111, 112, and 113 and actuators 121, 122, and 123. Preferably, predominantly periodic state messages are transported on the physical communication channels 200. The time intervals during which no time-triggered messages are transported can be used to transport event-triggered messages.

Intelligent sensors which are connected to two distributor units (such as the sensor 112, for example) can each transmit two copies of a time-triggered message simultaneously via the two independent communication channels 200 to the distributor units 232 and 234 for further distribution. As soon as the final receiver has received a correct copy of this message, it discards the other copy.

Status Messages

The access semantics to the data of a periodic status message substantially correspond to the access semantics to variables in a programming language. Upon reading, the present value of the status message is assumed. Because the old version is overwritten upon the arrival of a new version of a status message, there are no queues in the case of communication by means of status messages. A precise description of the access semantics of status messages is found in [Kop11, p. 91].

Time-Triggered Virtual Machine (TTVM)

The timely execution of a real-time software component (RTSC) is performed on a time-triggered virtual machine (TTVM), which is emulated by the operating system of a node computer (see also [FTS15]).

The concept of emulation is understood in computer science as the reproduction of the function of one computer by another computer. The concept of virtualization is understood as the formation of an emulated service unit by a software layer of a native operating system running in a specific hardware environment. By means of virtualization, nonphysical computer resources, such as emulated hardware, emulated operating systems, emulated data memories, or emulated network resources may be formed. The virtualization enables abstract computer resources having defined performance features to be formed without reference to a specific physical runtime environment, for example, an emulated operating system by a native operating system running on specific hardware. Virtualization has achieved great economic significance in the field of cloud computing.

A time-triggered virtual machine (TTVM) is an abstract service unit, which has emulated computer resources provided by the native operating system running in a node computer during a periodic real time interval (the service interval SI), to execute the real-time software component which was allocated to the TTVM in the SI in a timely manner. A node computer can contain multiple TTVMs. The length of the SI is expressed by the SI parameter.

In general, the beginning points in time and the end points in time of the periodic SIs of TTVMs are specified a priori on the global time axis in the scope of the system design. The input data have to arrive before the beginning point in time of an SI. After the end point in time of an SI, the output data can be transferred to a communication system for further transport. During the SI, the protected access to the network resources and memory resources assigned to the TTVM is enabled for the TTVM by the operating system running on the specific machine and a defined computer power is allocated to the TTVM for executing the RTSC running in the TTVM such that the intended output data can be provided by the RTSC before the end of the SI.

The fact that the beginning point in time of the SI is known a priori to the operating system of a node computer enables the operating system to perform measures, for example, securing the data of running processes, before the beginning point in time of the SI, to be able to provide the full computer power of the node computer to the provided RTSC at the beginning of the SI.

The length of the SI of a TTVM has to be selected so that the hardware of the node computer is capable of completing the assigned RTSC in a timely manner during the a priori defined SI.

The length of an SI is dependent on the performance requirement of the RTSC and the performance of the available hardware.

A TTVM implements a virtual software/hardware interface for executing a specified computer action.

Allocation Plan

The imaging of the user software of FIG. 1 on the hardware architecture of FIG. 2 is performed by an allocation plan.

An allocation plan is active at a point in time when the imaging of user software defined in the allocation plan is implemented on the hardware at this point in time.

An allocation plan is passive at a point in time when the imaging of the user software defined in the allocation plan is provided on the hardware and the required resources are provided in the node computers or distributor units, but it is not implemented at this point in time.

A passive allocation plan can be prepared before the startup of the system and can be loaded into the node computers and distributor units or it can be computed during running operation and loaded into the node computers or distributor units.

A differentiation is made between a local allocation plan (LAP) and a global allocation plan (GAP).

A local allocation plan (LAP) relates in each case to a specific RTSC or a distributor unit.

A LAP for an RTSC preferably contains the following items of information:
  The assignment of the RTSC to a TTVM of a node computer
  The parameters of the TTVMs—the operating system of a node computer requires these parameters to install a TTVM in a node computer—such as:
    beginning point in time and end point in time of the SI
    memory regions for computations of the RTSC
    executable code of the RTSC
    the time plans for the time-triggered communication of this RTSC A LAP for a distributor unit contains the time plans for the time-triggered communication in this distributor unit.

A global allocation plan (GAP) consists of the totality of the local allocation plans, which are adapted to one another, of all RTSC and all distributor units of the user software.

Active Redundancy

Active redundancy may be implemented easily using the described method on the provided hardware/software architecture.

The specific configuration of the active redundancy is dependent on the pre-established fault hypothesis ([Kop11, p. 153]).

If the fault hypothesis specifies the fail-silent property of the node computer, active redundancy can then be implemented by the simultaneous activation of two independent TTVMs with the same SRRTSC on different node computers, wherein the receivers continue the messages as soon one of the time-triggered messages has arrived from one of these two TTVMs.

If the fault hypothesis does not specify the fail-silent property of a node computer, active redundancy can be implemented by the simultaneous activation of three independent TTVMs with the same SRRTSC on three different node computers (Triple Modular Redundancy (TMR) see Kop11, p. 155), wherein the receivers continue the messages as soon as two of the three received time-triggered messages contain bit-identical results.

If the fault hypothesis does not specify the fail-silent property of a node computer, a fail-silent behavior of an SRRTSC can be implemented by the simultaneous activation of two independent TTVMs with the same SRRTSC on two different node computers, wherein a receiver delays the messages until both time-triggered messages should have arrived and discards the result if the results of the two independent time-triggered messages are not bit-identical.

Monitor Component
  It is the task of the SRRTSC 135, the monitor component
    to recognize a failure of a hardware component and to activate fault handling, for example, in that a command is issued to replace the presently active GAP with a presently passive GAP, and/or
    with a command to initiate the reconfiguration of a system, in particular the computer system, to implement new functions which are contained in a newly prepared GAP with expanded or additional RTSC.

The monitor component 135 recognizes the failure of an SRRTSC from the failure of the periodic ground state message directed thereto of an SRRTSC.

It is advantageous to differentiate between a transient and a permanent failure cause of a component. Experience has shown that the substantially greater part of the failures of computer systems can be attributed to transient failure causes.

In the case of a transient failure cause, the inner state of a component is corrupted, but the hardware of the component remains intact. In this case, the failure can be remedied in that the component is supplied with a correct state and integrated back into the system (restart).

Ground State

One condition for a rapid restart is the planning of periodic restart points in the design phase. It is advantageous if the periodic restart points are planned in immediately before the beginning of a new frame, because at this point in time the inner state has a minimal scope. We refer to the (short) interval between the end of the service interval of one frame and the beginning of the following frame as the ground state interval, in which the ground state of an SRRTSC is defined (see [Kop11, p. 86]). The ground state is the data structure which has to be transferred from one frame to the following frame, and has to be reestablished during the restart after a fault. The time interval between two restart points is referred to as a ground cycle.

It is advantageous if a periodic global restart point is specified a priori in a global ground state interval, during which all RTSC and all distributor units remain in the ground state thereof. At this global restart point, the entire system can be reconfigured by the activation of a new expanded GAP.

The ground state of an SRRTSC in the ground state interval is preferably periodically transmitted in the form of a ground state message to the monitor component 135 of FIG. 1. In the case of the restart of an SRRTSC, the monitor component 135 transmits the last received ground state before the next restart point in time, which has to be in the ground state interval, to the restarting SRRTSC.

Reconfiguration

In the case of a permanent failure cause, the affected hardware component remains permanently defective. In this case, the software/hardware allocation has to be reconfigured by a monitor component. A reconfiguration provides, on another functional node computer, a new TTVM having corresponding performance for executing the RTSC affected by the failure.

The reconfiguration requires that the failure of a hardware component is recognized by a monitor component and a passive global allocation plan which considers the recognized failure is activated. This passive global allocation plan replaces the previous active global allocation plan upon its activation.

In a safety-critical system, the reconfiguration has to run very rapidly. It is preferably therefore defined that passive allocation plans for fault handling are already prepared in the design phase and the required data structures are available a priori for retrieval in the affected hardware components.

As an example, Table 1 shows six passive global allocation plans (specifically only the part of the allocation plans which relates to the assignment of the SRRTSC to the hardware components) for the case that one of the hardware components of FIG. 2 has failed. The entries in Table 1 indicate to which node computer of FIG. 2 (which are listed in the header of Table 1) the SRRTSC are allocated in case of fault (first entry in each line of Table 1). PAP stands for "passive allocation plan."

TABLE 1

Active and passive global allocation plans

| Hardware components | 232 | 234 | 241 | 242 | 243 | 244 |
|---|---|---|---|---|---|---|
| Active allocation plan (everything functioning) | ok | ok | SRRTSC 131 | SRRTSC 132 133 | SRRTSC 134 135 | SRRTSC 135 |
| PAP-1 (HW component 232 failed) | failed | ok | failed | failed | SRRTSC 131 135 | SRRTSC 132 133 134 |
| PAP-2 (HW component 234 failed) | ok | failed | SRRTSC 131 135 | SRRTSC 132 133 134 | failed | failed |
| PAP-3 (HW component 241 failed) | ok | ok | failed | SRRTSC 131 | SRRTSC 134 135 | SRRTSC 132 133 |
| PAP-4 (HW component 242 failed) | ok | ok | SRRTSC 131 | failed | SRRTSC 132 133 | SRRTSC 134 135 |
| PAP-5 (HW component 243 failed) | ok | ok | SRRTSC 131 | SRRTSC 134 135 | failed | SRRTSC 132 133 |
| PAP-6 (HW component 244 failed) | ok | ok | SRRTSC 131 | SRRTSC 132 133 | SRRTSC 134 135 | failed |

As soon the monitor component determines a permanent failure, it transmits reconfiguration messages having the identification of the selected local passive allocation plan to the Technology Independent Control Interfaces (see [Kop11, p. 94]) of the affected node computers and distributor units. After completion of the reconfiguration by the components, the system restart is to be carried out as after a transient fault.

The allocation after the failure of a node computer is simplified if a reserve node computer for assuming the functions of a failed node computer is provided in the hardware structure.

After the allocation of the safety-critical real-time software components to new TTVMs, the failed non-safety-relevant real-time software components (NSRRTSC) can be allocated according to the best-effort principle to TTVMs, which can be configured on the remaining functioning node computers. The allocation plans for NSRRTSC can also be calculated online in consideration of the present system state.

A fault in the monitor component is safety-critical, because a functional allocation can be interfered with by such a fault.

Therefore, in the fault-free case, the monitor component 135 is preferably executed simultaneously on two TTVMs, which are installed on two different node computers, to be able to recognize a hardware fault in a node computer. The two results, which are computed independently of one another, are transmitted by means of time-triggered messages via time-triggered communication channels to the specified receivers. A specified receiver waits until the defined reception points in time of the two messages have been exceeded. As soon as both messages have arrived, the receiver compares the results contained in the messages. It discards both messages if the two results are not bit-identical.

The monitor component 135 can preferably also be executed on a self-checking node computer, which only has fail-silent failures.

Separate Structural Units

Figure 3:
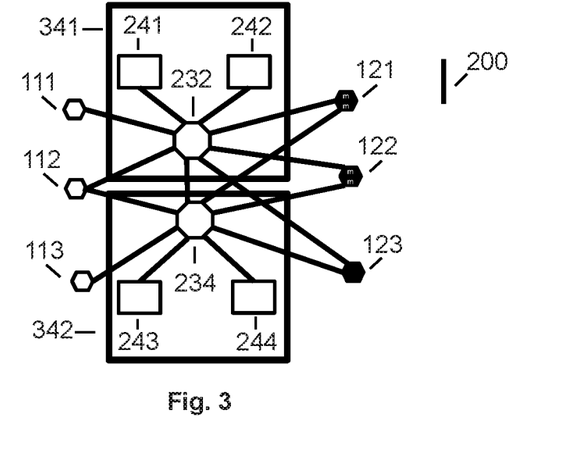
FIG. 3 shows how the components of the hardware from FIG. 2 can be combined into structural units.

FIG. 3 shows the allocation of the hardware components of FIG. 2 onto two separate structural units 341 and 342. Each of the two structural units has a processing capacity, for example, which is sufficient to execute the safety-critical functions in accordance with the passive allocation plans PAP-1 and PAP-2 of Table 1. The allocation of the hardware configuration of FIG. 2 onto two structural units, which are installed at spatially separated locations, ensures that even after mechanical damage to one structural unit, for example, in the event of an accident, the functional second structural unit can still execute the safety-relevant functions.

Security

In some real-time applications, it is required that one of the node computers, for example, the node computer 244 in FIG. 2, supports a wireless connection to external computers. It can accordingly be defined that a security firewall is installed in this node computer. A security firewall is an SRRTSC of a distributed computer system, which checks whether incoming and outgoing messages of a system fulfill specified security conditions (security assertions). The security assertions can be formulated in the form of a special security markup language, for example, SAML [Cam15].

On-Line Evolution of Systems

In many technical applications, for example, in the smart grid for power supply, operation has to be maintained 24 hours per day and 7 days per week. In these applications, it is not possible to shut down the controlling computer system to install a new version of the software.

The present invention enables, inter alia, a large distributed computer system to be expanded online, i.e., during operation. For this purpose, a new version of a global allocation plan (GAP) having expanded or new RTSC has to be prepared.

In a first phase, the phase of test operation, the new expanded RTSC are installed on shadow TTVMs. A shadow TTVM is a TTVM, which runs on an existing or new node computer to execute an RTSC and which is supplied with the input data of the running process, but the output data of which are not conducted into the running process, but rather to a test console. In the test phase, additional intelligent sensors can also be configured to supply the RTSC executed on the shadow TTVM. As soon as the new RTSC have been sufficiently tested, the phase of the test operation is completed.

In the second phase, the phase of the switchover, during the next global restart point, the existing GAP is replaced by the new version of the GAP and the computed output data of the new version of the GAP are conducted to the running process.

The problem of hardware obsolescence can be solved as follows using the proposed architecture: firstly, shadow TTVMs for the existing RTSC are configured and tested on a new hardware generation. As soon the tests have been successfully completed, during the next global restart point, the new GAP is activated, wherein the new GAP shuts down the old hardware components and conducts the results of the RTSC running on the new hardware generation to the process.

LITERATURE

[FTS 15] Verfahren zur Realisierung and zum Ausführen einer umfangreichen Echtzeitcomputeranwendung [method for implementing and executing an extensive real-time computer application]. Patent filed by FTS Computertechnik with the Austrian patent office on Feb. 12, 2015.

[Kop11] Kopetz, H. *Real-Time Systems—Design Principles for Distributed Embedded Applications*. Springer Verlag 2011.

[Cam15] Campbell, B. et al. Security Markup Language (SAML) 2.0 Profile. Internet Engineering Task Force. RFC7522, May 2015. Accessed on Feb. 15, 2017 at URL: https://tools.ietf.org/html/rfc7522.html.

The invention claimed is:

1. A fault-tolerant distributed real-time computer system for controlling a physical system, the fault-tolerant distributed real-time computer system comprising:
   node computers;
   distributor units;
   intelligent sensors; and
   intelligent actuators,
   wherein the node computers, the distributor units, the intelligent sensors, and the intelligent actuators have access to a global time of known precision, and wherein the node computers, the intelligent sensors, and the intelligent actuators periodically exchange time-triggered messages and event-triggered messages via the distributor units,
   wherein functions of user software are contained in two or more real-time software components (RTSC) and a periodic time control data transfer between the two or more RTSC is pre-established by a time-triggered data flow diagram,
   wherein, in active local allocation plans for each RTSC, an assignment of the RTSC to a time-triggered virtual machine (TTVM) of one of the node computers and the following parameters of the TTVM are specified: (i) a beginning point in time and an end point in time of a service interval (SI), (ii) memory regions for calculations of the RTSC, (iii) executable code of the RTSC, and (iv) time plans for a time-triggered communication of the RTSC,
   wherein, in active local allocation plans for each of the distributor units, the time plans for the time-triggered communication are contained in said distributor unit, and wherein a global allocation plan consists of a totality of the local allocation plans, which are adapted to one another, of all of the two or more RTSC and all of the distributor units of the user software, wherein a monitor component periodically receives a copy of messages of the node computers to determine a present operating state of the node computers, wherein, after a permanent failure of at least one of the two or more RTSC, the monitor component activates a passive global allocation plan, which specifies an allocation of the two or more RTSC and a data supply thereof on the TTVM that is newly installed on the node computers that are still functional, wherein the RTSC arrive on the TTVM that is newly configured for execution at a provided periodic restart point in time in accordance with the passive global allocation plan.

2. The real-time computer system according to claim 1, wherein an SI parameter of the SI interval in one of the active local allocation plans is dependent on a performance of the node computer on which the TTVM for one of the RTSC is installed, and wherein this SI parameter is specified a priori.

3. The real-time computer system according to claim 1, wherein a restart point in time of one of the two or more RTSC is located in a periodically repeating ground state interval.

4. The real-time computer system according to claim 1, wherein a periodic global restart point is a priori located in a global ground state interval, during which ground state interval, all of the two or more RTSC and all of the distributor units remain in the global ground state thereof.

5. The real-time computer system according to claim 1, wherein the active local allocation plan is provided a priori in each of the node computers and each of the distributor units, and the passive global allocation plan is or is configured to be stored in each of the node computers and each of the distributor units.

6. The real-time computer system according to claim 1, wherein a new passive allocation plan is computed during operation and loaded into one of the node computers or one of the distributor units.

7. The real-time computer system according to claim 1, wherein the monitor component receives a message having a ground state of one of the two or more RTSC from the RTSC before an end of a ground state cycle.

8. The real-time computer system according to claim 1, wherein the monitor component (135), after the permanent failure of the at least one of the two or more RTSC, transmits a last received ground state of said at least one RTSC to a restarted RTSC.

9. The real-time computer system according to claim 1, wherein the monitor component selects the passive global allocation plan after a permanent failure of one of the node computers and, after an allocation of safety-critical real-time software components to new TTVMs, allocates failed non-safety-relevant real-time software components (NSRRTSC) according to a best-effort principle to TTVMs which can be configured on the node computers that remain functioning.

10. The real-time computer system according to claim 1, wherein when a fault hypothesis specifies a fail-silent property of one of the node computers, active redundancy is implemented by simultaneous activation of two independent TTVMs with a same RTSC, wherein receivers of messages continue as soon as one of the time-triggered messages has been received from the two independent TTVMs.

11. The real-time computer system according to claim 1, wherein when a fault hypothesis does not specify a fail-silent property of one of the node computers, active redundancy is implemented by simultaneous activation of three independent TTVMs with a same RTSC, wherein receivers of messages continue as soon as two of three received time-triggered messages contain bit-identical results.

12. The real-time computer system according to claim 1, wherein when a fault hypothesis does not specify a fail-silent property of one of the node computers, a fail-silent property is implemented by simultaneous activation of two independent TTVMs with a same safety-relevant RTSC (SRRTSC), wherein receivers of messages wait until both time-triggered messages should have arrived and discard a result if results in the two time-triggered messages, upon arrival, are not bit-identical.

13. The real-time computer system according to claim 1, wherein the monitor component runs simultaneously on two TTVMs, which are executed on two different ones of the node computers, and wherein two results, which are computed independently of one another, are transmitted by the time-triggered messages via time-triggered communication channels to specified receivers, and wherein a specified receiver waits until a priori defined reception points in time of the two time-triggered messages have been exceeded and, if both messages have arrived, compares results contained in the time-triggered messages and discards received data if the two results are not bit-identical.

14. The real-time computer system according to claim 1, wherein the monitor component is executed on a self-checking node computer.

15. The real-time computer system according to claim 1, wherein the intelligent sensors which are connected to two distributor units each transmit two copies of the time-triggered message simultaneously via two independent communication channels (200) to the distributor units for further distribution, and wherein a final receiver of this message, as soon as it has received a correct copy, discards the other copy.

16. The real-time computer system according to claim 1, wherein in a test operation, newly expanded RTSCs are installed in parallel to existing RTSCs on shadow TTVMs and are supplied with running input data of an existing process, wherein output data of the newly expanded RTSCs are not switched into the existing process.

17. The real-time computer system according to claim 1, wherein TTVMs for existing RTSCs are installed on a new hardware generation.

18. The real-time computer system according to claim 1, wherein at least one reserve node computer is provided for assuming functions of a failed one of the node computers.

19. The real-time computer system according to claim 1, wherein the node computers and the distributor units are allocated to two spatially separated structural units.

20. The real-time computer system according to claim 1, wherein one of the node computers which implements a wireless connection to external computers contains a security firewall.

* * * * *